(12) United States Patent
Chu

(10) Patent No.: US 8,576,557 B2
(45) Date of Patent: Nov. 5, 2013

(54) STAND FOR PORTABLE HAND HELD DEVICE

(76) Inventor: Darryl Chu, New York, NY (US)

(*) Notice: Subject to any disclaimer, the term of this patent is extended or adjusted under 35 U.S.C. 154(b) by 365 days.

(21) Appl. No.: 12/927,081

(22) Filed: Nov. 5, 2010

(65) Prior Publication Data

US 2011/0170246 A1 Jul. 14, 2011

Related U.S. Application Data

(60) Provisional application No. 61/335,719, filed on Jan. 11, 2010.

(51) Int. Cl.
*H05K 5/00* (2006.01)
*H05K 7/00* (2006.01)
*G06F 1/16* (2006.01)

(52) U.S. Cl.
USPC .............. 361/679.3; 361/679.26; 361/679.41; 361/679.55; 361/679.56

(58) Field of Classification Search
USPC .............. 361/679.26, 679.3, 679.56, 679.58, 361/679.41, 679.01, 679.55; 248/917–924
See application file for complete search history.

(56) References Cited

U.S. PATENT DOCUMENTS

| | | | | |
|---|---|---|---|---|
| 5,899,421 A | * | 5/1999 | Silverman | 248/175 |
| 6,874,744 B2 | * | 4/2005 | Rawlings et al. | 248/292.14 |
| 6,999,008 B2 | * | 2/2006 | Wang et al. | 341/22 |

* cited by examiner

*Primary Examiner* — Anthony Haughton
(74) *Attorney, Agent, or Firm* — Francis C. Hand; Carella, Byrne et al

(57) ABSTRACT

The stand is made of a pair of hingedly connected plates for holding a portable device in a clamped upright position for viewing and for use purposes. The plates are hinged at one end and biased by a spring into a closed position to clamp about opposite sides of the portable device. The edges of the plates are provided with a rubberized bead to provide a non-slip surface.

22 Claims, 5 Drawing Sheets

STAND FOR PORTABLE HAND HELD DEVICE

This is application claims the benefit Provisional Patent Application 61/335,719, filed Jan. 11, 2010.

This invention relates to a stand for a portable hand held device. More particularly, this invention relates to a stand for mobile devices, smart phones, other mp8 devices and game devices.

Portable devices, such as smart phones and mp3 players, are now ubiquitous, as is their ability to aid managerial tasks, display variety of digital media such as email, web content and video and in particular, to be hand held. More and more people now rely on these devices as essential tools for their everyday tasks.

Usually, these devices are placed on flat surfaces while not in use and, when in use, require the user to hold the device with one or both hands to view or operate. When viewing media, such as web content or video, on such a device, the user usually looks for objects to support the device at an upright angle as a solution for hands-free viewing. However, this poses instability and inconvenience as the device often tips or slips off the support when the portable device is moved, adjusted or disturbed.

Portable devices come in multitude of sizes and shapes and, in some instances, are often purchased with accessories, such as protective cases. Since the protective cases also come in various sizes and shapes and since a user may be reluctant to remove the protective case once applied, the user faces a difficulty in finding the right hands-free support for the device. In addition, accessories, such as a headphone organizer or caddy, which are likely used and carried, require a user to often look for solutions to minimize accessory bulk.

As is known, there are many types of stands and support devices on the market for holding devices, such as iphones, on a table top for ease of viewing, particularly, over extended time periods. Generally, these stands are made only to accommodate a specific brand and/or model of the portable device. Further, most stands require a protective case, if any, to be removed for operation. In addition, most previously known stands are operated in the manner of an easel, placing the portable device on one end of the stand while leaning at an angle against the other end of the stand, providing stability only if the portable device is undisturbed. Some stands are made larger than the portable device itself and are thus too cumbersome for travel. Still other known stands require additional aid from other object/devices. For example, no stand is known that functions as a stand-alone device, capable of supporting various sizes of portable media devices with or without a protective case, and compact enough to fit in places, such as a shirt pocket.

Accordingly, it is an object of the invention to provide a stand for a media device that allows hand-free viewing of the media device at a comfortable angle while providing stability without having to hold the stand.

It is another object of the invention to provide a stand for a media device that can be used with other accessories.

It is another object of the invention to provide a stand for a media device that is small enough for traveling.

Briefly, the invention provides a stand that allows any portable device to be placed on a surface, platform or object allowing for hands-free viewing at a comfortable angle. The stand allows a user to mount the portable device in an upright manner, for example, on a desk, a table top and the like, for viewing purposes and for operation of the device in a hands-free manner.

Depending on the viewing screen of a portable hand-held device, the stand may be positioned to hold the device in a vertical portrait position or may be rotated 90° to hold the device in a horizontal landscape position.

The stand is of compact construction so as to fit in a shirt pocket or carried in a pocket or purse or the like when not in use.

In particular, the stand has a pair of hingedly connected plates disposed for movement between a closed position and an open position for holding a portable device in a clamped upright position for viewing and for use purposes. Each plate is hinged at one end to the other plate and has a curved or raked or angled opposite end for receiving one respective side of the portable device in abutting relation with the plates in the open position. In addition, a spring biases the pair of plates from the open position towards the closed position to clamp the portable device between the curved ends of the plates.

The stand includes a pivot pin that passes through one end of each of the pair of plates for pivotally mounting of one of the plates on the other of the plates. In this embodiment, one of the plates has a bifurcated end defining a pair of legs that receive the pivot pin in rotatable relation while the other plate has an end disposed between this pair of legs and that is fixed to the pivot pin for pivoting therewith. In addition, the spring has a pair of ends mounted in one of the plates, an intermediate section biased against the other of plate to move this plate towards the opposite plate into the closed position of the plates and a pair of coiled sections disposed about the pivot pin. Each coiled section is disposed between the intermediate section and a respective end of the spring.

In addition, one of the plates of the stand is bifurcated at the curved end to define a pair of legs and the curved end of the other plate is disposed between these two legs when in the closed position to provide a flat cross-sectional shape.

The curved ends of the two plates have a rubberized surface extending about a periphery thereof for supporting the stand on a support surface in a non-slip manner and for holding the portable device in a non-slip manner. In this respect, the stand may rest via the bifurcated end of one plate on a support surface or rotated 180° to rest via the other plate on the support surface.

The stand may also have a rubberized surface covering the hinged ends of each plate for supporting the stand on a support surface in a non-slip manner.

The stand is also capable of organizing an accessory, such as headphone cord, to minimize the number of accessories required by the user. For example, in the case of a headphone cord, one end of the cord is channeled between the two plates and then wrapped around the narrow part of the bottom plate and secured by channeling the other end of the cord between the two plates again.

The stand can be made of any suitable material, such as plastic, metal or wood.

These and other objects and advantages of the invention will become more apparent from the following detailed description taken in conjunction with the accompanying drawings wherein.

Figure 1:
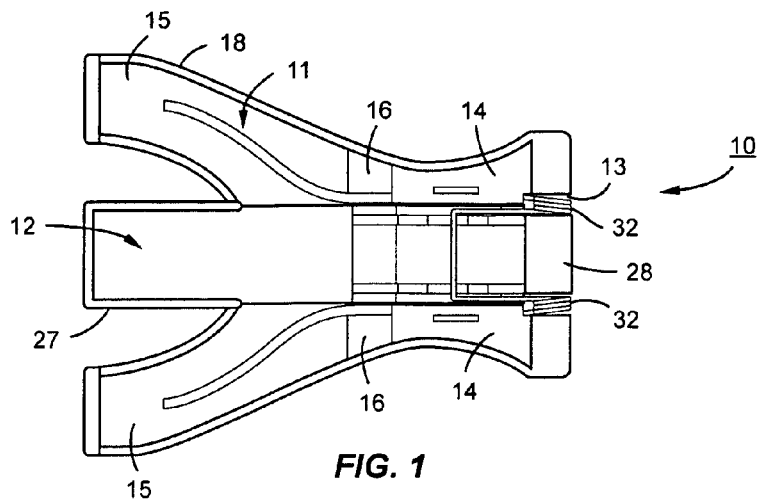
FIG. 1 illustrates a top view of a stand in accordance with the invention in a closed position.
Figure 2:
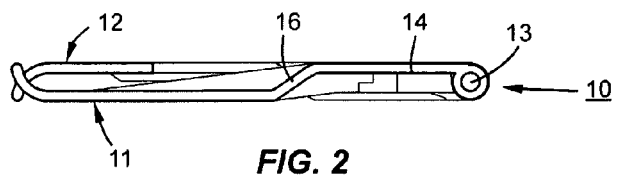
FIG. 2 illustrates a side view of the stand of FIG. 1.
Figure 3:
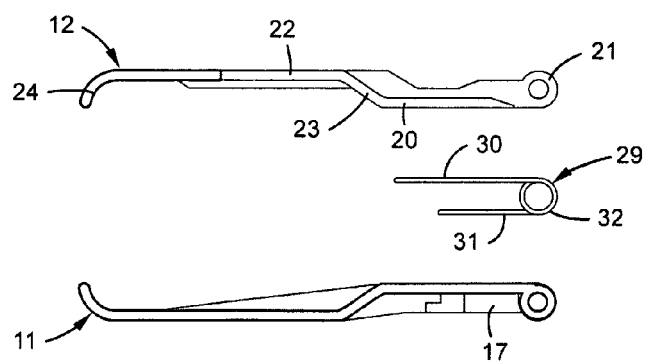
FIG. 3 illustrates an exploded side view of the stand of FIG. 1.
Figure 4:
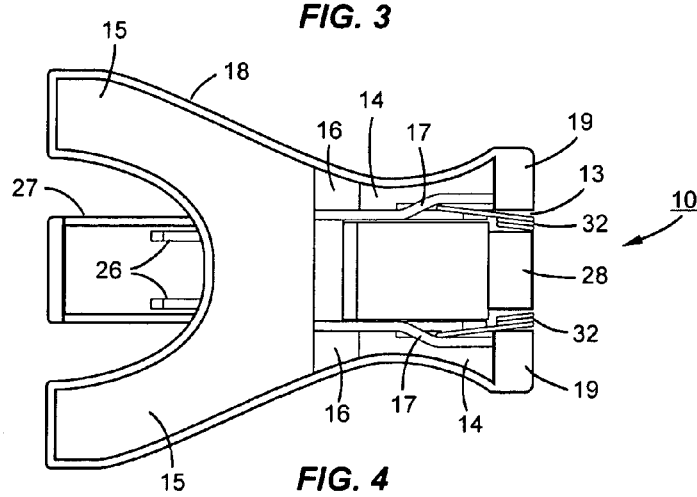
FIG. 4 illustrates a bottom view of the stand of FIG. 1 in the closed position.
Figure 5:
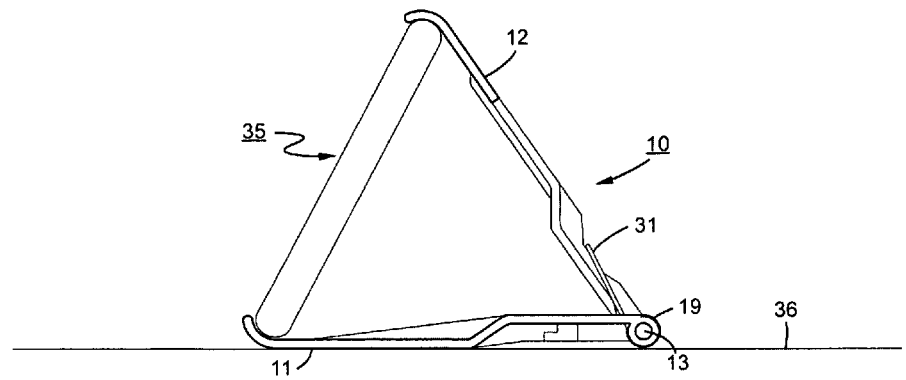
FIG. 5 illustrates a side view of the stand of FIG. 1 supporting a portable device in an upright manner in accordance with the invention.
Figure 8:
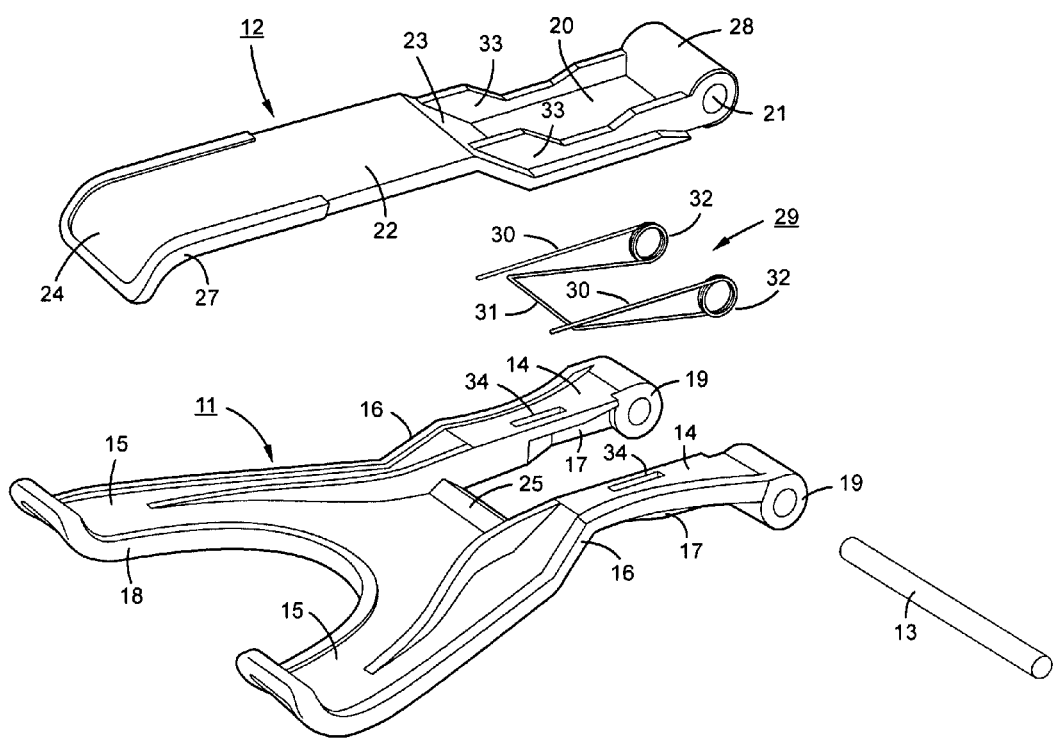
FIG. 8 illustrates an exploded perspective view of the stand of FIG. 1.
Figure 9:
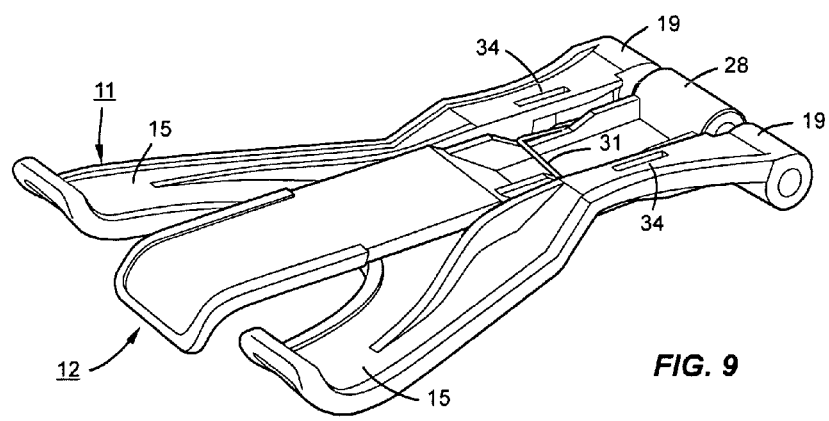
FIG. 9 is a perspective view of the stand of FIG. 1 in the closed position.

Referring to FIGS. 1 to 4, 8 and 9, the stand 10 is formed of two plates 11, 12 that are hinged together by a pivot pin 13 at one end to move between a closed position with the plates 11, 12 in parallel as shown in FIGS. 2 and 9 and an open position with the plates 11, 12 in angular relation as shown in FIG. 5.

Referring to FIGS. 4 and 8, the bottom plate 11 is of a skeletal shape with a bifurcated end forming two legs 14, each of which receives the pivot pin 13 in a rotatable manner, and an opposite bifurcated end of Y-shape extension forming two legs 15, each of which is curved at the end. The skeletal shape of the bottom plate 11 provides efficiencies in manufacturing costs and imparts an aesthetic appearance.

Referring to FIGS. 2 and 3, the Y-shaped extension of the bottom plate 11 is generally flat on the underside, as viewed, to allow resting on a flat support surface while the legs 14 are offset in a raised manner relative to the Y-shaped extension via an angular transition 16 between each leg 14 and the Y-shaped extension.

Referring to FIGS. 3 and 4, a rib 17 extends perpendicularly from and along an inside edge of each leg 14 to provide a flat surface co-planar with the underside of the Y-shaped extension.

Referring to FIGS. 1 and 4, the periphery of the plate 11 is covered by a rubberized surface 18 or coating or other non-slip material to enhance the gripping ability of the stand 10 as well as non-slip ability when in use on a surface. As indicated, the rubberized surface 18 is in the form of a bead or lip that covers the peripheral edge of the plate 11 while extending over the top and bottom of the plate 11 for a short distance. In addition, the ends 14 of the plate 11 that receive the pivot pin 13 are each covered by the same rubberized material in the shape of an encasing cylinder 19 for the same purposes.

Referring to FIGS. 1 and 8, the top plate 12 is of generally rectangular shape and is disposed symmetrically of the bottom plate 11. The top plate 12 has a base 20 with a cylindrical end 21 receiving the pivot pin 13 and an extension 22 offset from the base 20 by an angularly disposed transition 23. The extension 22 has a curved edge 24.

Referring to FIGS. 2 and 3, the base 20 of the top plate 12 is flat and is sized to fit between the legs 14 of the bottom plate 11 when in the closed position. In addition, the underside of the base 20 is sized to be coplanar with the flat underside of the Y-shaped extension of the bottom plate 11 when in the closed position.

Referring to FIG. 2, the top plate 12 is within the plane of the bottom plate 11 when in the closed position. In this respect, the curved ends of the plates 11, 12 overlap with each other when in the closed position.

Referring to FIG. 8, the bottom plate 11 is provided with an angularly disposed ledge 25 across the rear of the Y-shaped extension, as viewed, which extends towards the top plate 12 to act as a stop against the transition 23 of the top plate 12. This ledge 25 also spaces the top plate 12 from the bottom plate 11 in the closed position. Structurally, the ledge 25 reduces flexing of the "Y" shaped extension of the bottom plate 11 and, aesthetically, keeps the two plates 11, 12 in parallel in the closed position.

Referring to FIG. 4, the extension 22 of the top plate 11 has a pair of ribs 26 on the side facing the bottom plate that are designed to prevent flexing of the top plate 11 and, as shown in FIG. 8, the bottom plate 11 has two sloping curved ribs 26'.

Referring to FIGS. 1 and 4, the periphery of the extension 22 of the top plate 12 that extends between the legs 15 of the bottom plate 11 is covered by a rubberized surface 27 or coating or other non-slip material, as above, to enhance the gripping ability of the stand 10 as well as non-slip ability when in use on a surface. As indicated, the rubberized surface 27 is in the form of a bead or lip that covers the peripheral edge of a portion of the extension 22 while extending over the top and bottom of the extension 22 for a short distance. In addition, the end 21 of the plate 12 that receives the pivot pin 13 is covered by the same rubberized material in the shape of an encasing cylinder 28 for the same purposes.

Referring to FIGS. 1, 3, 4 and 8, a spring 29, such as a torsion spring, biases the two plates 11, 12 towards the closed position. The spring 29 has a pair of straight ends 30 mounted in the bottom plate 11, e.g. passing through openings (not shown) in the ribs 17, an intermediate section 31 of U-shape (see FIG. 1) biased against the top plate 12 to move the top plate 12 towards the bottom plate 11 and into the closed position and a pair of coiled sections 32 each of which is disposed about the pivot pin 13. Each coiled section 32 is disposed between the intermediate section 31 and a respective end 30 of the spring 29.

In order to move the plates 11, 12 of the stand 10 into an open position relative to each other, the Y-shaped extension of the bottom plate 11 may be held in one hand and the thumb of the other hand used to push upwardly on the base 23 of the top plate 12 to cause the top plate 12 to pivot away from the bottom plate 11.

Referring to FIGS. 1 and 8, the top plate 12 is formed on the topside with a pair of ribs 33 along opposite edges to receive the U-shaped intermediate section of the spring 29 thereon. The bottom plate 11 is formed with a pair of slots 34 in line with the straight ends 30 of the spring 29 for production purposes in order to provide for injection molding of the support ribs 17.

Figure 6:
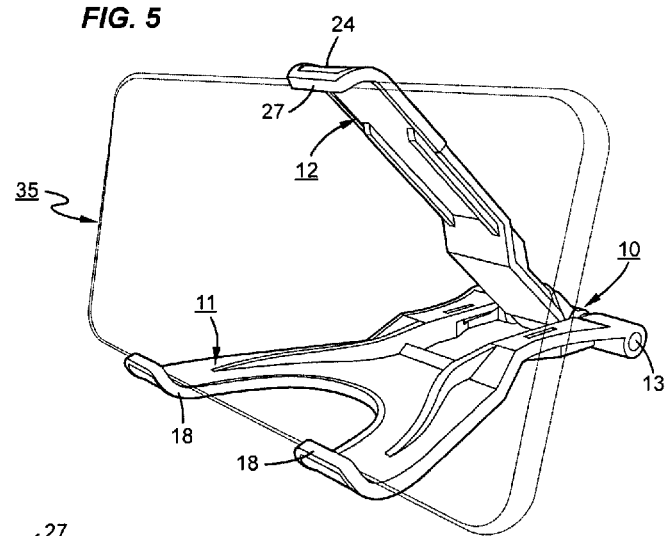
FIG. 6 illustrates a perspective front view of the stand of FIG. 1 supporting a portable device in a horizontal (landscape) position.
Figure 7:
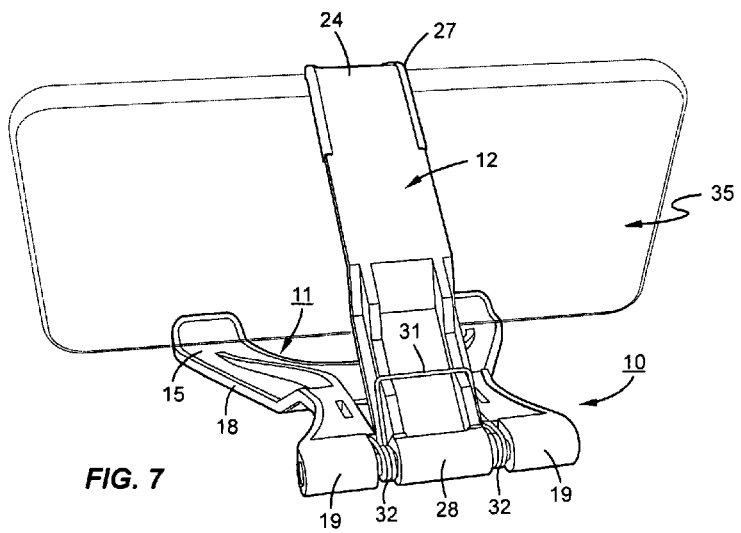
FIG. 7 illustrates a perspective rear view of the stand of FIG. 1 supporting a portable device in a horizontal (landscape) position.

Referring to FIGS. 5, 6 and 7, wherein like reference numerals indicate like parts as above, when in an opened position, the plates 11, 12 of the stand 10 support a portable device 35 between the respective curved ends of the plates 11, 12. Also, the ends of the ribs 26 on the top plate 11 and the ends of the ribs 26' on the bottom plate 12 act as stoppers to prevent the device 35 from slipping inward.

Referring to FIGS. 5, 6 and 7, when resting on a flat surface 36, such as a desk top, the bottom plate 11 of the stand 10 lays flat on the flat surface 36 while the top and bottom edges of the portable device 35 are gripped by and between the curved edges 14 of the plates 11, 12. As shown, the portable device 35 is supported in a horizontal (landscape) position.

Figure 10:
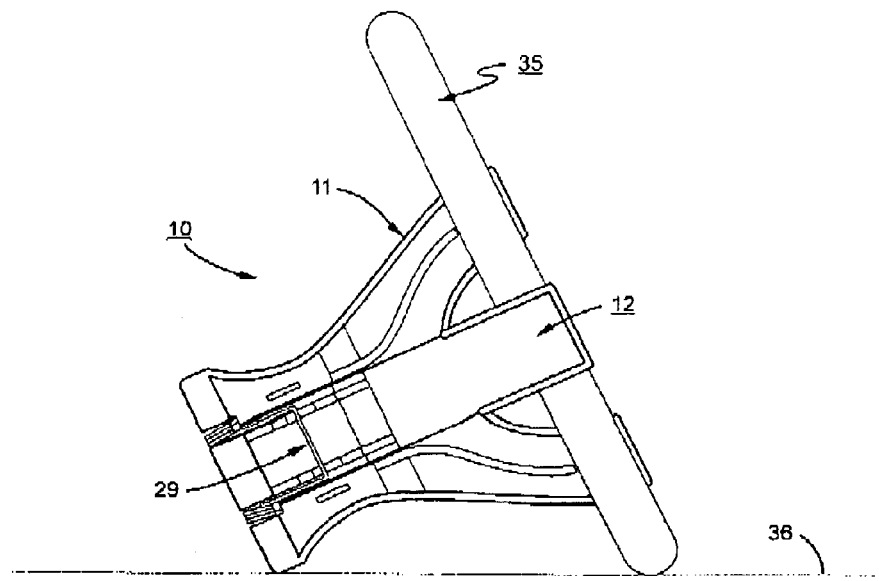
FIG. 10 illustrates a side view of the stand of FIG. 1 supporting a portable device in a vertical (portrait) position.
Figure 11:
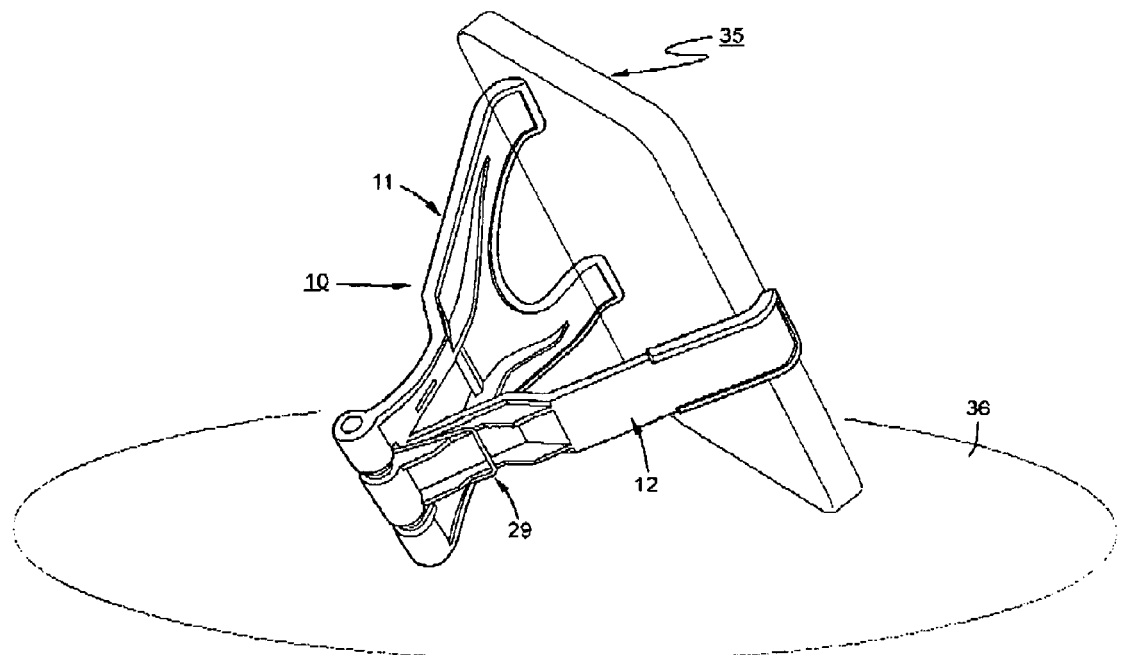
FIG. 11 illustrates a perspective view of the stand and portable device of FIG. 10.

Referring to FIGS. 10 and 11, wherein like reference numerals indicate like parts as above, the portable device 35 may be positioned in a vertical (portrait) position by turning the stand 10 90° and resting the stand 10 on the flat surface 36. In this position, the curved ends of the plates 11, 12 grip the sides of the device 35 and only the hinged end of the stand 10 touches the flat surface 36 while the bottom edge of the portable device 35 rests on the flat surface 36.

The stand 10 is sized to fit into a pocket of a user, for example, a shirt pocket when closed. For example, the stand 10 fits into a cubic space of 2.5 inches by 3 inches by ¼ inch. The plates 11, 12 of the stand 10 are able to pivot against the bias of the spring 29 into angular positions relative to each other of more than 90° so as to grip a device 35 of a length greater than 4 inches. For example, depending on the strength of the spring 29, the plates 11, 12 may form an angle of up to 90°.

The stand 10 is also capable of receiving a portable device 35 of relatively wide dimensions. For example, the stand 10 may have a width less than one-third the width of the portable device 35.

Figure 12:
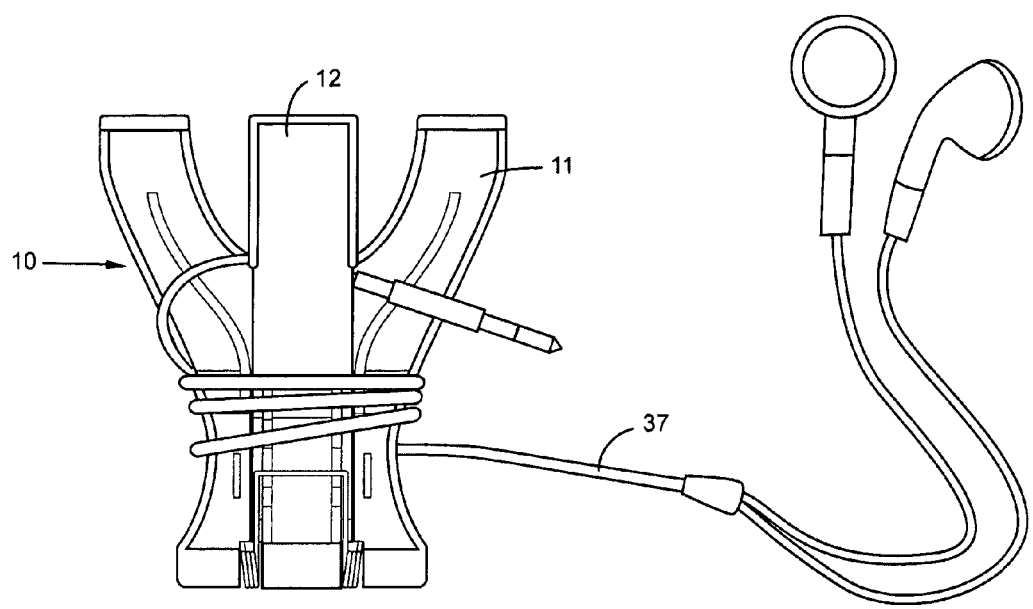
FIG. 12 illustrates a view of the stand with a headphone cord being wrapped about the stand.
Figure 13:
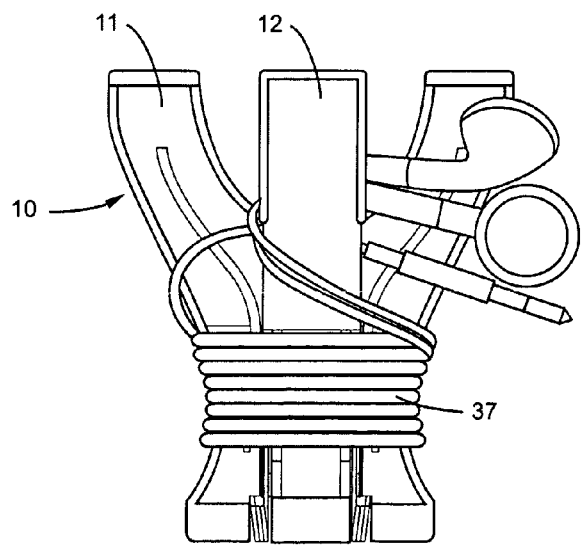
FIG. 13 illustrates a view of the stand of FIG. 12 with the headphone cord secured in place.

Referring to FIGS. 12 and 13, the stand 10 may be used for storage of a headphone cord 37 when not in use to hold a device 35. For example, as shown in FIG. 12, one end of the cord 36 is channeled between the two plates 11, 12 of the stand 10 when in the closed position and then wrapped around the narrow part of the bottom plate 11. As shown in FIG. 13, the cord 36 is secured in place by channeling the other end of the cord 36 between the two plates 11, 12 again.

The invention thus provides a stand for a media device that allows hand-free viewing of the media device at a comfortable angle while providing stability without having to hold the stand.

The invention also provides a stand for a media device that can be used with other accessories, for example where the device 35 that has a protective case.

The invention also provides a stand for a media device that is small enough for traveling.

What is claimed is:

1. A stand for a portable hand-held device comprising
a pair of hingedly connected plates disposed for movement between a closed position and an open position for holding a portable device in a clamped upright position for viewing and for use purposes, each plate of said pair of plates being hinged at one end thereof to the other of said pair of plates and having a curved end for receiving one respective side of the portable device in abutting relation with said pair of plates in said open position; and
a spring biasing said pair of plates from said open position towards said closed position to clamp the portable device between said curved ends of said pair of plates.

2. A stand as set forth in claim 1 wherein one of said pair of plates has a bifurcated end opposite said curved end thereof defining a pair of legs and the other of said plates has an end opposite said curved end thereof disposed between said pair of legs of said one plate.

3. A stand as set forth in claim 2 wherein said one plate is bifurcated at said curved end thereof to define a pair of legs and said curved end of said other plate is disposed between said legs of said curved end of said one plate.

4. A stand as set forth in claim 2 wherein each said leg of said one plate has a rubberized surface extending about a periphery thereof for supporting the stand on a support surface in a non-slip manner and for holding the portable device in a non-slip manner.

5. A stand as set forth in claim 2 wherein said curved end of said other plate has a rubberized surface extending about a periphery thereof for holding the portable device in a non-slip manner.

6. A stand as set forth in claim 1 further comprising a pivot pin passing through said one end of each of said pair of plates for pivotally mounting of one of said pair of plates on the other of said pair of plates.

7. A stand as set forth in claim 6 wherein one of said pair of plates has a bifurcated end defining a pair of legs and receiving said pivot pin in rotatable relation in said pair of legs and the other of said plates has an end disposed between said pair of legs of said one plate and fixed to said pivot pin for pivoting therewith.

8. A stand as set forth in claim 7 wherein said spring has a pair of ends mounted in one of said pair of plates, an intermediate section biased against the other of said pair of plates to move said other plate towards said one plate in said closed position of said pair of plates and a pair of coiled sections disposed about said pivot pin, each said coiled section being disposed between said intermediate section and a respective end of said pair of ends.

9. A stand as set forth in claim 7 wherein each said leg of said one plate has a rubberized surface extending about a periphery thereof for supporting the stand on a support surface in a non-slip manner and for holding the portable device in a non-slip manner.

10. A stand as set forth in claim 9 wherein said curved end of said other plate has a rubberized surface extending about a periphery thereof for holding the portable device in a non-slip manner.

11. A stand as set forth in claim 7 further comprising a rubberized surface covering an end of each of said legs of said one plate receiving said pivot pin and said end of said other plate fixed to said pivot pin for supporting the stand on a support surface in a non-slip manner.

12. In combination,
a portable hand-held device having a viewing screen for viewing an image in a vertical portrait position; and
a stand supporting said device in a vertical position, said stand including a pair of hingedly connected plates disposed for movement between a closed position and an open position for holding said device in a clamped vertical position for viewing and for use purposes, each plate of said pair of plates being hinged at one end thereof to the other of said pair of plates and having a curved end for receiving one respective side of said device in abutting relation with said pair of plates in said open position; and
a spring biasing said pair of plates from said open position towards said closed position to clamp the portable device between said curved ends of said pair of plates.

13. The combination as set forth in claim 12 wherein said stand has a pivot pin passing through said one end of each of said pair of plates for pivotally mounting of one of said pair of plates on the other of said pair of plates.

14. The combination as set forth in claim 13 wherein said one plate is bifurcated at said curved end thereof to define a pair of legs engaging one side of said device and said curved end of said other plate is disposed between said legs of said curved end of said one plate in engagement with an opposite side of said device.

15. The combination as set forth in claim 14 wherein each said leg of said one plate has a rubberized surface extending about a periphery thereof for holding said portable device in a non-slip manner.

16. The combination as set forth in claim 14 wherein said curved end of said other plate has a rubberized surface extending about a periphery thereof for holding an opposite side of said device in a non-slip manner.

17. The combination as set forth in claim 13 wherein said stand has a rubberized surface covering said one end of at least one of said plates for supporting said stand on a support surface in a non-slip manner.

18. In combination,
a portable hand-held device having a viewing screen for viewing an image in a horizontal landscape position; and
a stand supporting said device in a horizontal position, said stand including a pair of hingedly connected plates disposed for movement between a closed position and an open position for holding said device in a clamped horizontal position for viewing and for use purposes, each plate of said pair of plates being hinged at one end thereof to the other of said pair of plates and having a curved end for receiving one of a base and a top of said device in abutting relation with said pair of plates in said open position; and a spring biasing said pair of plates from said open position towards said closed position to clamp the portable device between said curved ends of said pair of plates.

19. The combination as set forth in claim 18 wherein said stand has a pivot pin passing through said one end of each of said pair of plates for pivotally mounting of one of said pair of plates on the other of said pair of plates.

20. The combination as set forth in claim 19 wherein said one plate is bifurcated at said curved end thereof to define a pair of legs engaging one of a top and a base of said device and said curved end of said other plate is disposed between said legs of said curved end of said one plate in engagement with an opposite one of said top and said base of said device.

21. The combination as set forth in claim 20 wherein each said leg of said one plate has a rubberized surface extending about a periphery thereof for holding said portable device in a non-slip manner and said curved end of said other plate has a rubberized surface extending about a periphery thereof for holding an opposite side of said device in a non-slip manner.

22. The combination as set forth in claim 21 wherein said stand has a rubberized surface covering said one end of at least one of said plates for supporting said stand on a support surface in a non-slip manner.

* * * * *